(12) United States Patent
Hatton

(10) Patent No.: US 7,739,964 B2
(45) Date of Patent: Jun. 22, 2010

(54) BOAT STORAGE AND CONTAINER UNIT

(76) Inventor: Grant Hatton, 10200 Old Church Road, Caledon, ON (CA) L7E 0P4

( * ) Notice: Subject to any disclaimer, the term of this patent is extended or adjusted under 35 U.S.C. 154(b) by 0 days.

(21) Appl. No.: 11/556,689

(22) Filed: Nov. 4, 2006

(65) Prior Publication Data

US 2007/0102597 A1     May 10, 2007

(30) Foreign Application Priority Data

Nov. 4, 2005   (CA) .................................... 2525377

(51) Int. Cl.
   *A47B 5/00*   (2006.01)
(52) U.S. Cl. .................... 108/47; 108/135; 108/152; 108/97
(58) Field of Classification Search ............... 248/238, 248/240, 240.3, 240.4, 242, 243, 244, 245, 248/250; 211/126.5, 126.6, 149, 150, 90.01, 211/104, 87.01, 169, 119.004; 108/16, 44, 108/47, 46, 143, 134, 135, 152, 97, 98, 147.16, 108/147.17, 157.13; 206/557
See application file for complete search history.

(56) References Cited

U.S. PATENT DOCUMENTS

| 2,333,734 | A | * | 11/1943 | Nieltopp ................. 297/188.01 |
| 2,556,724 | A | * | 6/1951 | Hubseh ...................... 297/173 |
| 3,201,017 | A | | 8/1965 | Morrissey |
| 3,889,805 | A | | 6/1975 | Korten |
| 4,033,648 | A | | 7/1977 | Lopez-Cepero |
| 4,059,248 | A | * | 11/1977 | Kuntz ........................ 248/214 |
| 4,170,801 | A | | 10/1979 | Ward |
| 4,271,624 | A | | 6/1981 | Peluso |
| 4,513,526 | A | | 4/1985 | Grace et al. |
| D298,884 | S | * | 12/1988 | Rychlock ................... D12/420 |
| 4,791,752 | A | | 12/1988 | Van Kampen |
| 4,858,366 | A | | 8/1989 | Rushton |
| 4,892,241 | A | | 1/1990 | Mavrakis |
| 5,140,914 | A | * | 8/1992 | Bohbot et al. ................. 108/44 |
| 5,261,180 | A | | 11/1993 | Foster et al. |
| 5,370,060 | A | * | 12/1994 | Wang .......................... 108/44 |
| 5,472,164 | A | * | 12/1995 | Contee, Jr. .................. 248/214 |
| 5,588,697 | A | * | 12/1996 | Yoshida et al. .............. 297/173 |
| 5,657,573 | A | | 8/1997 | Fischer et al. |
| 5,775,655 | A | * | 7/1998 | Schmeets .................... 248/240 |
| 5,815,894 | A | | 10/1998 | Soriano |
| 5,865,410 | A | * | 2/1999 | Horen ........................ 248/242 |
| 6,101,966 | A | | 8/2000 | Cumisky |

(Continued)

*Primary Examiner*—A. Joseph Wujciak, III
(74) *Attorney, Agent, or Firm*—Rolf Fasth; Fasth Law Offices

(57) ABSTRACT

The boat storage container unit is adapted to be supported on a boat. The boat storage container unit has a support unit and a container sized and shaped to store fishing tackle, tools and the like and adapted to slide onto the support unit. The support unit has a vertical support member, an attachment device for attaching the vertical support member to a boat, a base and a connection device at one end of the base to pivotally connect the base to the vertical support member. The connection device is adapted to permit the base to be moveable from a vertical position to a retainable horizontal position. A top surface of the base and a bottom surface of the container have inter-engaging means to permit the container to slide onto and be retainer on the base.

7 Claims, 3 Drawing Sheets

U.S. PATENT DOCUMENTS 6,224,011 B1    5/2001  Gavaza, III
6,224,127 B1 *  5/2001  Hodge .................... 296/26.08
6,257,944 B1    7/2001  Herrod
7,341,005 B2 *  3/2008  Baggott ...................... 108/42

* cited by examiner

BOAT STORAGE AND CONTAINER UNIT

PRIOR APPLICATION

This application is a U.S. national phase application claiming priority from Canadian Patent Application No. 2,525,377, filed 4 Nov. 2005.

FIELD OF THE INVENTION

The present invention provides boaters with an apparatus in which to keep tackle and tool boxes off the floor of their vessels. The invention preferably has a slim design to keep the unit close to the gunwale of the boat when not in use. The invention preferably includes one or more interchangeable boxes providing a more efficient apparatus in which to store lures and access equipment.

BACKGROUND

Fisherman and recreational boaters need a solution to the storage of their tools and tackle boxes which provide easy storage and accessibility to tools and tackle while aboard the boat. Known devices have proven unsuccessful. The following US patents have attempted to provide a solution: U.S. Pat. Nos. 6,101,966, 4,271,624, and 4,033,648.

SUMMARY OF THE INVENTION

The present invention provides a boat storage container unit adapted to be supported on a boat. The boat storage container unit comprises a support unit and a container sized and shaped to store fishing tackle, tools and the like and adapted to slide onto the support unit. The support unit has a vertical support member, means for attaching the vertical support member to a boat, a base and means at one end of the base to pivotally connect the base to the vertical support member. The means to pivotally connect the base to the vertical support member is adapted to permit the base to be moveable from a vertical position to a retainable horizontal position. A top surface of the base and a bottom surface of the container have inter-engaging means to permit the container to slide onto and be retainer on said base.

BRIEF DESCRIPTION OF DRAWINGS

In order that the invention may be more clearly understood, the preferred embodiment thereof will now be described in detail by way of example, with reference to the accompanying drawings, in which.

Further features of the invention will be described or will become apparent in the course of the following detailed description.

DETAILED DESCRIPTION

Figure 1:
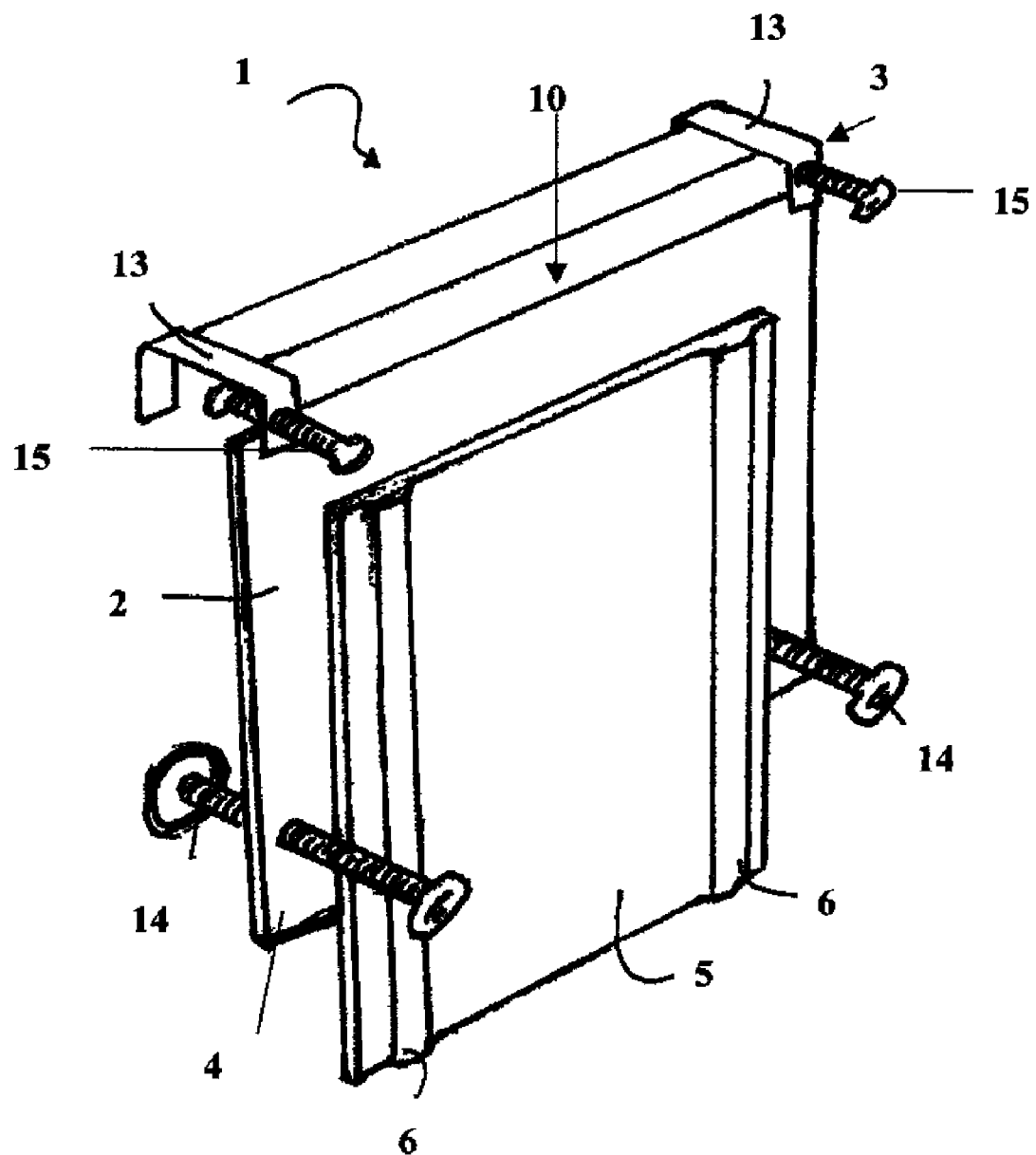
FIG. 1 is a front perspective view of a support unit, having a support member and a base pivotally connected to the vertical support member, for a boat container storage unit according to the present invention.
Figure 2:
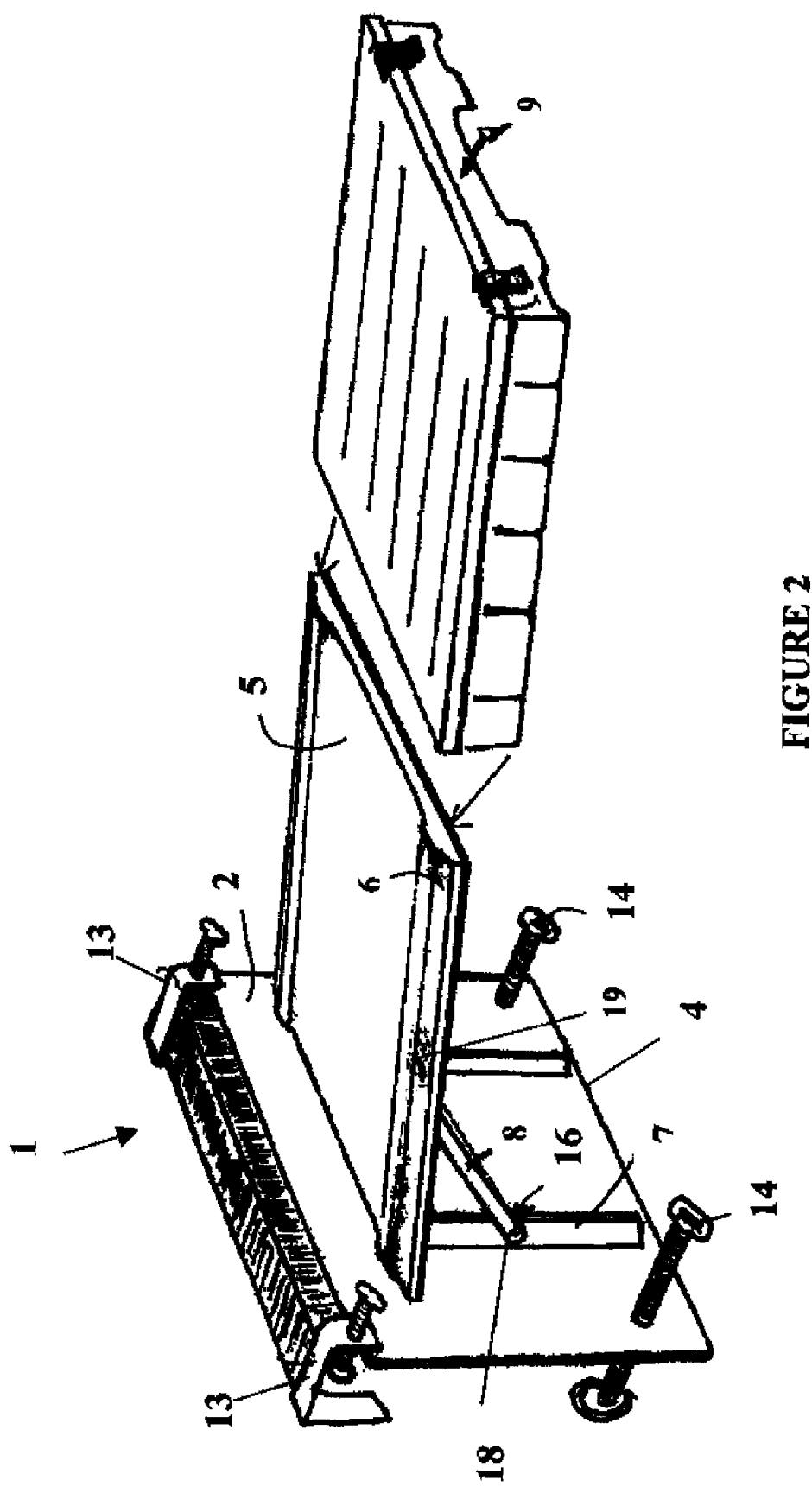
FIG. 2 is a front perspective view of a boat container storage unit according to the present invention comprising the support unit of FIG. 1 and one embodiment of a container adapted to slide onto the support unit.
Figure 3:
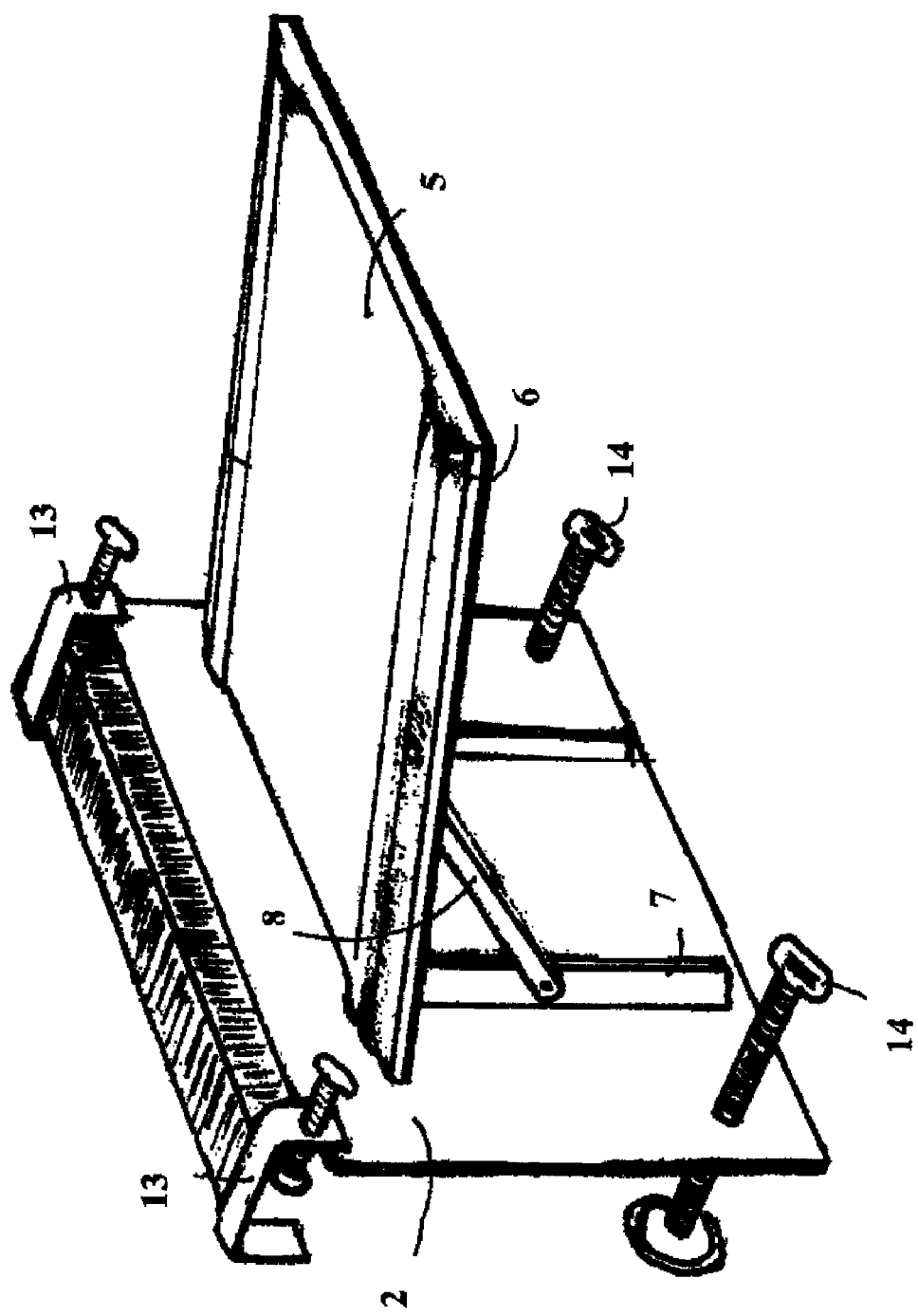
FIG. 3 is a front perspective view of the support unit of FIG. 1 with the base in its up position.

Referring now to the drawings, FIG. 1 illustrates a support unit 1 for a boat storage container unit according to the present invention that is adapted to enable a user to perform a variety of tasks thereon and when provided with a container to store a variety of items therein. Although the support unit 1 could take on a multitude of shapes and structures and still accomplish its purpose, the embodiment as shown in FIGS. 1-3 has a vertical support member 2 which when mounted on a boat, rests vertically on the inner side of the hull of the boat and a support base 5 pivotally mounted to the vertical support member 2.

The vertical support member 2 is attached to the boat by mounting means, generally indicated at 3. The mounting means illustrated in FIGS. 1-3 consist of a pair of downwardly facing U-shaped gunwale clamps 13 with a threaded adjustment screw 15 at a top edge 10 of vertical support member 2. The downwardly facing U-shaped gunwale clamps 13 are sized and shaped to fit over and hang on the gunwale of the hull of a boat. The adjustment screws 15 are adapted to tighten onto the gunwale to hold the vertical support member 2 in position. The gunwale clamps 13 are sized and shaped to fit different sizes of boats. In order to make sure the vertical support member 2 is in a vertical position and to keep the unit secured with movement of the boat, a pair of hull clamps 14 in the form of a pair of threaded adjustment screws are provided adjacent a bottom edge 4 of vertical support member 2. While the preferred embodiment illustrates gunwale clamps, other suitable fastening means are useable and within the scope of the present invention.

In order to mount the boat storage container unit support 1 in position on the side of the vessel, the hull clamps 14 will be screwed through threaded holes in the vertical support member 2. The fisherman will twist the hull clamps 14 until the end is securely positioned against the hull of the vessel.

The support base 5 in the embodiment illustrated is generally flat and rectangular having one end pivotally connected to the vertical support member 2. In the embodiment illustrated the means to connect the base 5 to the vertical support member 2 consists of bracketing system 16. The bracketing system 16 has a pair of vertical mounting members 7 and 45° angle brackets 8 where one end 18 of bracket 8 is mounted to the vertical mounting member 7 and the other end of the bracket 19 is mounted to the bottom surface of the base 5. The vertical mounting members 7 are fastened to the vertical support member 2 by conventional fastening means, preferably by screws equi-spaced along the vertical mounting members 7. The 45° angle brackets 8 are attached to the bottom surface of base 5 using screws. In order for the base 5 to go from its up to down position, the bracketing system 10 operates on a hinge and pivot system so that the support base 5 can rest flat with the vertical support member 2 when in the down position (as shown in FIG. 1) and pivot to an up position as shown in FIG. 3. Brackets 8 must be adapted to lock in position so that the base 5 is supported when in the up position. Brackets 8 must also be adapted to un-lock so that the base 5 can pivot to the down position when not in use. When in the down position the base 5 folds away making travelling around the boat easier and safer. When in the down position the support base 5 rests parallel and flush with the vertical support member 2. This maximizes the fisherman's usable space while operating their vessel.

The boat storage container unit of the present invention comprises a boat storage container support 1 and container (box) 9 adapted to contain fishing tackle, tools etc. as best shown in FIG. 2. Different sizes and shapes for container 9 are within the scope of the present invention although a thin design is preferred. The container 9 is adapted to slide on to base 5 utilizing inter-engaging means on the container and base, preferably a rib and groove connection. In the embodiment illustrated, container 9 has a pair of grooves on its bottom surface sized and shaped to allow it to quickly slide into corresponding raised ribs 6 on the top surface of base 5. The combination rib and groove connection can be reversed and permit the container 9 to slide onto and snap into a stationary position on base 5 when in the up position. Once immobile, the lid of the universal container 9 can be opened and closed easily and allow the fisherman greater accessibility while on board the vessel. The lid of the container can be secured so that when the base is moved to the closed position and container 9 is still on the base 5 it won't fly open. Where the container 9 is attached to the base 5 in the down position, this keeps the container or box off the floor of the boat and interfering with movement around the boat or creating a safety hazard.

The boat storage container unit of the present invention maybe fabricated from any suitable materials, most preferably ones that are water resistant, light weight and durable, such as treated wood, metal or, most preferably plastic. For ease of cleaning and durability, it is most preferable that the boat storage container unit be formed of highly durable plastic or plastic polymer.

Although various preferred embodiments of the present invention have been described herein in detail, it will be appreciated by those skilled in the art, that variations may be made thereto without departing from the spirit of the invention or the scope of the appended claims.

I claim:

1. A boat storage container unit, comprising:
   a support unit having a vertical support member,
   means for attaching the vertical support member to a boat,
   a base pivotally connected to the vertical support member so as to move between a retainable horizontal position, and a vertical position where the top surface of the base faces outwardly and away from the vertical support member, and
   a container sized and shaped to store fishing tackle and tools, and adapted to slide onto the base, wherein the top surface of the base and the bottom surface of the container have a combination of grooves and ribs that inter-engage to permit the container to slide onto and be retained on the base, wherein the means for attaching the vertical support member to a boat comprises clamps attached to a top edge of the said vertical support member, said clamps sized and shaped to accommodate different sizes of boats and wedge against a gunwale or other upstanding non-cylindrical structure on the boat.

2. The boat storage container unit of claim 1 wherein the means to pivotally connect the base to the vertical support member is a bracketing system having one or more 45° angle brackets attached to a bottom surface of the base.

3. The boat storage container unit of claim 2 wherein the one or more 45° angle bracket(s) are pivotally connected to the vertical support member and the base so that the support base is movable from a vertical position to a horizontal position and locked in position.

4. The boat storage container unit of claim 1 wherein the means for attaching the vertical support member to a boat includes one or more gunwale clamps attached to a top edge of the said vertical support member, said gunwale clamps sized and shaped to accommodate different sizes of boats.

5. The boat storage container unit of claim 4 wherein said gunwale clamps are generally downwardly facing U-shaped clamps with a threaded fastener for securing the clamps to the boat.

6. The boat storage container unit of claim 1 wherein the means for attaching the vertical support member to a boat further includes one or more hull clamps adjacent a bottom edge of the vertical support member to retain the vertical support member in a generally vertical position and stationary against the hull of the boat.

7. The boat storage container unit of claim 1 fabricated from a water resistant, light-weight and durable material.

\* \* \* \* \*